Figure 1:
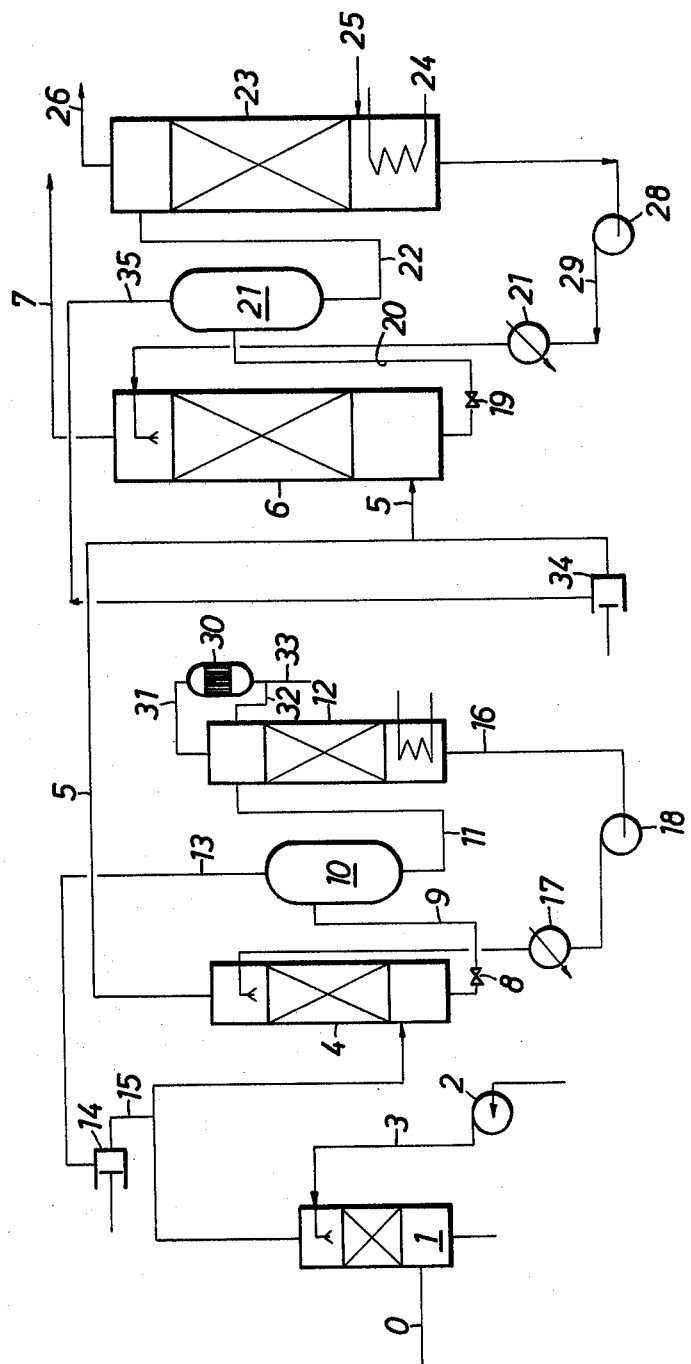

United States Patent [19]

Bratzler et al.

[11] 4,088,735

[45] May 9, 1978

[54] PROCESS FOR PURIFYING GASES FROM THE GASIFICATION OF FOSSIL FUELS

[75] Inventors: Karl Bratzler, Bad Homburg; Alexander Doerges, Frankfurt am Main; Gerhard Hochgesand, Neu-Isenburg; Manfred Kriebel, Frankfurt am Main, all of Germany

[73] Assignee: Metallgesellschaft Aktiengesellschaft, Frankfurt am Main, Germany

[21] Appl. No.: 764,316

[22] Filed: Jan. 31, 1977

Related U.S. Application Data

[63] Continuation of Ser. No. 593,818, Jul. 7, 1975, abandoned.

[30] Foreign Application Priority Data

Jul. 10, 1974 Germany .............................. 2433078

[51] Int. Cl.$^2$ ............................................. B01D 53/34
[52] U.S. Cl. ................................... 423/219; 423/245; 55/68; 55/73; 423/220; 423/224; 423/228; 423/236; 423/238; 423/240; 423/243
[58] Field of Search .............. 423/210, 220, 226, 228, 423/238, 243, 245, 573, 219, 224, 236, 240; 55/73, 68

[56] References Cited

U.S. PATENT DOCUMENTS

| | | | |
|---|---|---|---|
| 664,677 | 12/1900 | Pippig et al. | 423/245 X |
| 2,598,034 | 5/1952 | Brown et al. | 55/73 |
| 2,784,055 | 3/1957 | Silver | 423/238 X |
| 3,642,431 | 2/1972 | Suzuki et al. | 423/226 |
| 3,653,809 | 4/1972 | Wehner et al. | 423/243 X |
| 3,709,976 | 1/1973 | Tarhan | 423/220 X |
| 3,714,327 | 1/1973 | Gimmarco | 423/220 |
| 3,914,399 | 10/1975 | Beazley | 423/226 X |
| 3,966,875 | 6/1976 | Bratzler et al. | 423/243 X |

FOREIGN PATENT DOCUMENTS 1,074,815   2/1960   Germany .............................. 423/226

*Primary Examiner*—Jack Cooper
*Attorney, Agent, or Firm*—Burgess, Dinklage & Sprung

[57] ABSTRACT

A process for purifying gases produced by the gasification of fossil fuels by a treatment with water vapor and oxygen under superatmospheric pressure. The raw gas produced is treated to remove catalyst-deteriorating impurities such as mono- and polyunsaturated hydrocarbons, mercaptans, HCN, HCl, $H_2S$, $CS_2$, COS, and $NH_3$, and to desulfurize the gas to produce an exhaust gas which is rich in $H_2S$. The gas is cooled and scrubbed under superatmospheric pressures and at normal temperatures. The raw gas, at a temperature of 150°–170° C, is indirectly cooled to ambient temperature. The condensible hydrocarbons are then separated and removed, and the gas is then scrubbed with water to remove ammonia in a first scrubbing stage wherein the rate of water addition is controlled to be just sufficient to remove the ammonia. The gas is then scrubbed with a high-boiling organic solvent which is miscible with water and to which sulfur has been added in a second scrubbing stage in which the rate of solvent addition is controlled in dependence on the solubility of the methyl mercaptan, which is to be removed, in the solvent. The gas is scrubbed with the same solvent in a third scrubbing stage in which the water content of the solvent is kept at 5–30 mol percent $H_2O$ in which $H_2S$ and COS are entirely and selectively removed from the gas. Lastly, the scrubbing agents from the second and third scrubbing stages are separately regenerated and recycled to the second and the third scrubbing stages for re-use.

5 Claims, 1 Drawing Figure

PROCESS FOR PURIFYING GASES FROM THE GASIFICATION OF FOSSIL FUELS

This is a continuation of application Ser. No. 593,818, filed July 7, 1975, now abandoned.

BACKGROUND

This invention relates to a process of purifying gases produced by a gasification of solid or liquid fossil fuels by treatment with water vapor and oxygen under superatmospheric pressure to remove catalyst-deteriorating impurities, such as mono- and polyunsaturated hydrocarbons, mercaptans, HCN, HCl, $H_2S$, $CS_2$, COS, and $NH_3$, and to desulfurize the gas, to produce an exhaust gas which is rich in $H_2S$, wherein the gas is cooled and scrubbed under superatmospheric pressures and at normal temperatures.

It is known that hydrogen for the synthesis of ammonia or for the catalytic hydrogenation and hydrogencarbon oxide mixtures for the catalytic synthesis of hydrocarbons (methane synthesis, Fischer-Tropsch synthesis, methanol synthesis or oxosynthesis) can be produced by gasifying various fossil fuels by a treatment with water vapor accompanied by a direct supply of heat (by a partial combustion with oxygen or air) or by an indirect supply of heat from the outside. In all cases the resulting raw gases must be purified to remove catalyst-deteriorating constituents, particularly sulfur compounds. In most cases, this is accomplished by scrubbing processes, by which the gases, which are usually produced and kept under superatmospheric pressure, are scrubbed under superatmospheric pressure with aqueous or organic scrubbing agents to remove the impurities.

In gases produced from natural gas or petroleum or fractions thereof, the catalyst-deteriorating impurities to be be removed consist mainly of $H_2S$, certain proportions of COS, and small amounts of HCN.

The purification of these gases is simpler than that of coal gases, which in addition to the above-mentioned constituents contain other impurities, such as $NH_3$, $CS_2$, mercaptans, and mono- and polyunsaturated hydrocarbons having 2 to 10 carbon atoms, i.e., acetylenes, olefins and diolefins, which tend to polymerize thermally or catalytically to form resins which deposit at various points, which results in clogging.

For the reasons stated above, the purification of coal gases has always been very expensive. This has been the case even with coke oven gases, even if they are used only as fuel gases. The purification has always included several stages for the separate removal of naphthalenes, benzene hydrocarbons, hydrogen sulfide, ammonia, and nitric oxide. Since the advent of the use of coal gases, e.g., those produced by a pressure gasification of coal, for catalytic synthesis, further stages have been added to the above-mentioned purifying processes. High concentrations of $CO_2$ have to be removed, and the gases have been scrubbed with water under superatmospheric pressure for this purpose, and purification processes are required to remove all organic sulfur compounds. Alkalinized iron oxide compositions have been used for the latter purpose at temperatures of about 180°-240° C.

A new scrubbing process has been introduced (German Pat. Nos. 843,545; 935,144 and 936,714), which is based on physical absorption and in which only methanol is used as a scrubbing agent to remove all impurities from coal gases and to provide a gas which is sufficiently pure for catalytic syntheses. This process represents a great technological progress specifically in the purification of coal gases. Methanol used as a scrubbing agent for this purpose can easily be thermally regenerated without any chemical change so that it can be continually re-used. The only disadvantage of methanol is its relatively high vapor pressure. To reduce the latter and also to increase the solubility of the gases to be scrubbed, the process is carried out at low temperature, which requires a refrigerating plant and a corresponding consumption of refrigerating energy.

While methanol scrubbing succeeds in removing all catalyst-deteriorating components and acid gases $H_2S$ and COS, the process in spite of the high expenditure involved, enables a selective desulfurization only to such an extent that the scrubbed gases are only slightly enriched with hydrogen sulfide and for this reason the latter cannot be processed in some cases by the Claus process to produce elementary sulfur unless an additional treatment to increase the concentration of $H_2S$ is adopted.

So far, no process has succeeded in satisfactorily purifying coal distillation gases by means of a single scrubbing agent so as to remove catalyst-deteriorating substances and to effect a selective desulfurization at the same time.

SUMMARY

The present invention eliminates these and other disadvantages of the prior art and provides for the purification of gases that have been produced by the gasification of solid and/or liquid fuels by a treatment with water vapor and oxygen under pressure, which purification results in a removal of catalyst-deteriorating impurities and in a desulfurization. The need for an expensive refrigerating process required in prior processes is eliminated. The pure gas resulting from this process can be used directly as a synthesis gas for various chenical syntheses such as the production of ammonia, methane, methanol, or for the Fischer-Tropsch synthesis.

This is accomplished according to the invention in that the raw gas, at a temperature of 150°-170° C, is indirectly cooled to ambient temperature, the condensible hydrocarbons are separated and removed, the gas is subsequently scrubbed with water to remove ammonia in a first scrubbing stage, in which the rate of water addition is controlled to be just sufficient to remove the ammonia, the gas is then scrubbed with a high-boiling organic solvent, which is miscible with water and to which sulfur is added, in a second scrubbing stage, in which the rate of solvent addition is controlled in dependence on the solubility of the methylmercaptan, which is to be removed, in the solvent, the gas is subsequently scrubbed with the same solvent in a third scrubbing stage, in which the water content of the solvent is kept at 5-30 mol percent $H_2O$ and in which $H_2S$ and COS are entirely and selectively removed from the gas, and the scrubbing agents from the second and third scrubbing stages are separately regenerated and recycled to the second and third scrubbing stages for re-use.

DESCRIPTION

The cooling of the raw gas to ambient temperature has the result that the condensible hydrocarbons as well as water vapor are separated until the saturation pressure has been reached. The mixture is removed and can be separately separated if this is desired.

The gas is subsequently scrubbed in a second scrubbing stage with water at such a rate that any $NH_3$ is entirely removed. This can be accomplished with water at a low rate because the high $CO_2$ content of the gas causes all $NH_3$ to be combined to $(NH_4)_2CO_3$ or $(NH_4)HCO_3$ whereby the solubility in water is increased.

That measure has the result that in the second scrubbing treatment, which succeeds the first scrubbing treatment and in which the gas is scrubbed with a high-boiling organic solvent, the dissolved components of the gas, such as HCN, $H_2S$, COS, can no longer participate in a formation of salts and for this reason can be removed from the scrubbing agent by strictly physical treatments, such as heating, stripping or flashing.

According to the invention, the scrubbing of the gas, from which $NH_3$ has been removed, with a high-boiling organic solvent is accomplished in two separate scrubbing stages in which the gas is conducted in a countercurrent with a scrubbing agent and under the operating pressure of the gas-producing means, and the scrubbing agent is recycled through absorption and regeneration stages. The scrubbing agent is circulated through the second scrubbing stage at such a race that methylmercaptan is removed, which has one of the lowest boiling point of all organic sulfur compounds contained in the gas. The solvent used in the second scrubbing stage may contain a certain amount of water, and a minimum content of water is essential in the organic solvent used in the third scrubbing stage. According to the invention, the water content of the organic solvent is kept at 5–30 mol percent so that the COS which is contained in the gas after the second scrubbing stage in addition to $H_2S$ is hydrolytically dissociated to form $CO_2$ and $H_2S$ and the resulting hydrogen sulfide is entirely removed together with the main amount of hydrogen sulfide.

According to an additional feature of the invention, sulfur is added to the scrubbing agent in the second scrubbing stage in an amount of 0.1 to 10 g, preferably 3 to 8 g, per liter of scrubbing liquid.

The sulfur used in the second stage may be formed in that the hydrogen sulfide contained in the gas leaving the first scrubbing stage is reacted in known manner according to the equation $2 H_2S + O_2 \rightarrow 2S + 2 H_2O$ (Claus process) with the oxygen contained in said gas. This measure has the advantage that the oxygen is removed from the gas at the same time. This addition of sulfur to the organic solvent used in the second scrubbing stage promotes the removal of the methylmercaptan because the latter is converted into dimethyl disulfide according to $4 CH_3SH + S_2 = 2CH_3 SS CH_3 + 2H_2S$.

According to a further feature of the invention, a soluble activator is added to the scrubbing agent used in the third scrubbing stage. This activator consists preferably of a compound which has a boiling point that is approximately as high as or higher than the boiling point of the high-boiling organic solvent.

Such compounds are, e.g., nitrogen-containing organic compounds, such as imidazole and its derivatives. Within the scope of the invention the activator consists preferably of 1,2-dimethylimidazole.

The solvent is suitably adjusted to an activator content of 1–20% by weight, preferably 5–15% by weight.

When the scrubbing agent used in the second scrubbing stage has been laden with the saturated and unsaturated hydrocarbons, with mercaptans and with hydrocyanic acid, it is regenerated in a regenerator to remove the substances which have been taken up and is then recycled to the absorber for re-use. The regeneration may be accomplished in known manner in that the scrubbing agent is flashed to atmospheric pressure and the substances taken up are stripped off with water vapor or inert gas or thermally by indirect heating. The scrubbing agent laden with $H_2S$ and COS which has left the third scrubbing stage is regenerated for re-use and for this purpose is fractionally flashed to atmospheric pressure and is then regenerated in a regenerator in which it is stripped with inert gas and/or subjected to a vacuum or a thermal treatment and is then cooled and fed back to the absorber so that the scrubbing agent is circulated through the absorber and regenerator.

Pyrrolidone or a derivative of pyrrolidone, preferably N-methylpyrrolidone, has been used as a high-boiling organic solvent within the scope of the invention.

Polyglycolether may also be used with good success.

Tetrahydrothiophene-1,1-dioxide, butyrolactone, and/or morpholine and/or polyglycolether and/or N-methyl-caprolactam have also proved suitable as organic solvents.

The advantages afforded by the invention reside mainly in that a simple and economical process has been provided for the purification of the gases which have been produced by a gasification of solid fossil fuels, such as coal, by a treatment with water vapor and oxygen under superatmospheric pressure. According to the invention, this purification to remove particularly catalyst-deteriorating compounds is accomplished by a simultaneous selective desulfurization. The scrubbing in three stages once with water and twice with a high-boiling, water-soluble organic solvent results in a removal of the impurities in three parts.

The gas is first scrubbed with water to remove ammonia. In the second scrubbing stage, an organic solvent is used to remove all catalyst poisons except for $H_2S$ and COS. These two constituents are finally removed in a third stage. The use of an a organic solvent containing 5–30 mol percent of water in the third stage results in a hydrolysis of COS.

Because the $H_2S$ is removed and the COS is hydrolyzed at the same time, less scrubbing agent is needed than would be required for a complete physical scrubbing of the COS, which has a low solubility in the solvents in question, particularly in N-methylpyrrolidone and polyglycolether but also in tetrahydrothiophene-1,1-dioxide and others.

The resulting pure gas may be directly used for various chemical syntheses. The pure gas may be used, e.g., to produce ammonia, methane, methanol, oxosyntheses or Fischer-Tropsch syntheses.

As a result of the reduced solvent requirement, the stripping step used to regenerate the scrubbing agent laden in the third stage results in an exhaust gas which is highly enriched with hydrogen sulfide.

For this reason, this gas can be processed by the Claus process to convert the hydrogen sulfide to elementary sulfur.

The invention is illustrated in the drawing and will be described more fully in the following example taken in conjunction with the accompanying drawing which is a flow sheet of a plant for carrying out the novel process.

EXAMPLE 1

In accordance with the drawing, a gas produced by a pressure gasification of hard coal with water vapor and oxygen is first directly cooled to 170° C by being sprinkled with water and is then indirectly cooled further to ambient temperature and separated from the condensate. The resulting gas had the following composition:
28.2% by volume $CO_2$
0.65% by volume $C_nH_m$
0.1% by volume $O_2$
20.8% by volume CO
39.2% by volume $H_2$
9.7% by volume $CH_4$
1.0% by volume $N_2$
0.35% by volume $H_2S$
organic sulfur compounds (COS, $CS_2$, RSH,

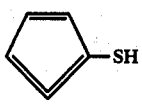

and others:
256 mg/standard $m^3$
10 mg/standard $m^3$ HCN
17 mg/standard $m^3$ $NH_3$ The unsaturated hydrocarbons $C_nH_m$ amounting to 0.65% by volume included 8.9 g/standard $m^3$ hydrocarbons boiling in the range of 40°–125° C.

The gas is under a pressure of 25 kg/cm². 100,000 standard $m^3$/h of the gas are fed through conduit O into the scrubbing tower 1 and for a removal of ammonia are conducted in a countercurrent and fed by means of pump 2 through conduit 3.

The further purification is accomplished in two additional scrubbing stages 4 and 6 with N-methylpyrrolidone as scrubbing agent. The circulating scrubbing agent (34 m³/h) from scrubbing stage 4 contains 6 g/l elementary sulfur. The gas leaving this scrubbing stage is entirely free of HCN, all organic sulfur compounds, mainly mercaptans, $CS_2$, and mono- and polyunsaturated hydrocarbons having a higher boiling point than methylmercaptan. Of all catalyst poisons, it contains only $H_2S$ and residual COS.

Of the organic sulfur compounds originally contained in the gas in a total amount of 256 mg/standard $m^3$, only 48 mg/standard $m^3$ are left. The mercaptans, inclusive of methylmercaptan, which has the lowest boiling point, have largely been scrubbed off as such and have partly been reacted to form higher-boiling disulfides, which have been scrubbed off. The organic sulfur compound residue consists only of COS.

The thus pretreated gas is fed through conduit 5 into scrubbing stage 6, in which it is scrubbed with 270 m³/h N-methylpyrrolidone which flows in a countercurrent and which contains 10 mol percent $H_2O$ and 8% by weight 1,2-dimethylimidazole as an activator. COS is hydrolyzed to form $H_2S$ and $CO_2$ by the coaction of water and activator. The pure gas which leaves the scrubber in conduit 7 contains less than 0.2 ppm S and is free of any other catalyst poison.

The scrubbing agent laden in scrubbing stage 4 is preflashed in that it is fed through pressure relief valve 8 and conduit 9 into the flashing vessel 10, from which the scrubbing agent flows through conduit 11 into the regenerating tower 12. The flashed-off gas is sucked from vessel 10 through conduit 13 by a compressor 14, which compresses the gas to the operating pressure.

The gas is then fed through conduit 15 and admixed to the raw gas.

The scrubbing agent is regenerated in the regenerator 12 and for this purpose is heated to its boiling point under subatmospheric pressure to remove the hydrocarbons, mercaptans and the like which have been taken up. By the circulating pump 18, the gas is fed through conduit 16 and cooler 17 to the top of the scrubbing tower 4 for re-use. The impurities and water which have been removed are fed through conduit 31 to the condenser 30. Part of the condensate is fed through conduit 32 as reflux to the regenerator. At the rate at which condensibles are supplied in the raw gas, the condensate is fed through conduit 33 to a separating system.

The scrubbing agent from scrubbing stage 6 is preflashed by being fed through the pressure relief valve 19 and conduit 20 into the flashing vessel 21, and is then fed through conduit 22 into the regenerating tower 23, in which it is degasified by a supply of heat (heater 24), under the action of a vacuum, or by means of a stripping gas (fed through conduit 25). The exhaust gas which is rich in $H_2S$ is fed through conduit 26 to a Claus process plant for further processing and may previously be re-scrubbed with water to remove solvent vapor. The stripped gas has the following composition:
12.0% by volume $H_2S$
87.4% by volume $CO_2$
0.2% by volume $H_2$
0.2% by volume CO
0.2% by volume $CH_4$ The degasified scrubbing agent is fed by the circulating pump 28 through the aftercooler 27 and conduit 29 back to the top of the scrubbing tower 6 and is re-used.

The gas which has been flashed off in the preflashing vessel 21 is sucked through conduit 35 by the compressor 34, which compresses the gas to operating pressure. The compressed gas is admixed to the gas flowing in conduit 5.

The pure gas leaving the third scrubbing stage has the following composition:
< 0.2 ppm $H_2S$
27.4% by volume $CO_2$
40.3% by volume $H_2$
21.3% by volume CO
10.0% by volume $CH_4$
1.0% by volume $N_2$ The gas having this composition may be used as such, or after a modification of the $CO/H_2$ ratio in a succeeding shift conversion stage, for various catalytic syntheses, e.g., for the synthesis of ammonia or for the synthesis of methane.

What is claimed is:

1. A process for purifying the raw gases produced in the gasification of fossil fuels by a treatment with steam and oxygen under superatmospheric pressure to remove, as catalyst deteriorating impurities, mono - and polyunsaturated hydrocarbons, mercaptans, HCN, HCl, $H_2S$, $CS_2$, COS AND $NH_3$ and to produce thereby a purified gas and an exhaust gas rich in $H_2S$ comprising:
(i) indirectly effecting the cooling of the raw gas under superatmospheric pressure from a temperature of 150° – 170° C to ambient temperature;

(ii) separating and removing condensed water and hydrocarbons;

(iii) effecting scrubbing of the gas in a first scrubbing stage with added water and wherein the rate at which water is added is controlled to be just sufficient to remove the ammonia from the gas;

(iv) scrubbing the ammonia-free gas containing $H_2S$ and other impurities by adding in the top of a second scrubbing stage in countercurrent to the ascending gas at least one high boiling organic solvent which is miscible with water and selected from the group consisting of pyrrolidone, N-methylpyrrolidone, polyglycolether, tetrahydrothiophene-1,1-dioxide, butyrolactone, morpholine and N-methyl-ε-caprolactam and to which sulfur has been added in an amount of 0.1 – 10 g per liter of the resulting scrubbing agent in which the rate of scrubbing agent addition is controlled to, thereby remove the mercaptans and the remainder of the catalyst deteriorating impurities except $H_2S$ and residual COS from the gas;

(v) regenerating the laden scrubbing agent from the second scrubbing stage by flashing and heating and/or stripping with one of steam or inert gasses and recycling it for reuse in the second scrubbing stage;

(vi) scrubbing the gas leaving the second scrubbing stage in a third scrubbing stage using at least one water-containing high boiling organic solvent which is miscible with water and selected from the group consisting of pyrrolidone, M-methyl pyrrolidone, polyglycolether, tetrahydrothiophene-1,1-dioxide, butyrolactone, morpholine and N-methyl-ε-caprolactam, maintaining the water content of said organic solvent at 5–30 mol percent, to which solvent a soluble imidazole activator has been added which has a boiling point that is approximately as high as or higher than that of the high-boiling organic solvent, and adjusting the activator content of this scrubbing agent to 1–20% by weight, thereby effecting hydrolysis of COS and removing it together with $H_2S$ selectively and entirely from said gas; and (vii) regenerating the laden scrubbing agent from the third scrubbing stage by flashing and heating and/or stripping with one of steam or inert gases and recycling it for reuse in the third scrubbing stage.

2. Process of claim 1, wherein sulfur is added to the scrubbing agent in the second scrubbing stage in an amount of 3–8 g per liter of scrubbing agent.

3. Process of claim 1, wherein the sulfur is produced in the second scrubbing stage by a reaction of hydrogen sulfide and oxygen contained in the gas leaving the first scrubbing stage and the oxygen is simultaneously removed from the gas.

4. Process of claim 1, wherein the scrubbing agent is adjusted to an activator content of 5 – 15% by weight.

5. Process of claim 1, wherein, 1,2-dimethylimidazole is used as the activator.

* * * * *

UNITED STATES PATENT AND TRADEMARK OFFICE
CERTIFICATE OF CORRECTION

PATENT NO. : 4,088,735
DATED : May 9, 1978
INVENTOR(S) : Bratzler et al

It is certified that error appears in the above–identified patent and that said Letters Patent are hereby corrected as shown below:

Column 4, line 21, insert -- $\epsilon$- -- before caprolactam.

Column 8, line 1, "M" should read -- N --.

Signed and Sealed this

Twenty-fourth Day of October 1978

[SEAL]

Attest:

RUTH C. MASON
Attesting Officer

DONALD W. BANNER
Commissioner of Patents and Trademarks